United States Patent
Martin et al.

(10) Patent No.: US 12,228,083 B2
(45) Date of Patent: Feb. 18, 2025

(54) PLANETARY GEARBOX DEVICE AND GAS TURBINE ENGINE WITH A PLANETARY GEARBOX DEVICE

(71) Applicants: Rolls-Royce Deutschland Ltd & Co KG, Blankenfelde-Mahlow (DE); Rolls-Royce plc, London (GB)

(72) Inventors: Ivo Martin, Schöneiche (DE); Björn Petersen, Berlin (DE); Andrea Minelli, Derby (GB)

(73) Assignees: ROLLS-ROYCE DEUTSCHLAND LTD & CO KG, Blankenfelde-Mahlow (DE); ROLLS-ROYCE PLC, London (GB)

( * ) Notice: Subject to any disclaimer, the term of this patent is extended or adjusted under 35 U.S.C. 154(b) by 0 days.

(21) Appl. No.: 18/325,240

(22) Filed: May 30, 2023

(65) Prior Publication Data
US 2023/0392555 A1    Dec. 7, 2023

(30) Foreign Application Priority Data
Jun. 7, 2022 (GB) ..................... 2208291

(51) Int. Cl.
  *F02C 7/36* (2006.01)
  *B64D 35/02* (2006.01)
  *F02C 7/06* (2006.01)

(52) U.S. Cl.
  CPC ............... *F02C 7/36* (2013.01); *B64D 35/02* (2013.01); *F02C 7/06* (2013.01); *F05D 2260/40311* (2013.01); *F05D 2260/98* (2013.01)

(58) Field of Classification Search
  CPC .... F02C 7/36; F02C 7/06; B64D 35/02; F05D 2260/98; F05D 2260/40311; F16H 57/04; F16H 57/042
  See application file for complete search history.

(56) References Cited

U.S. PATENT DOCUMENTS

| | | | |
|---|---|---|---|
| 7,604,470 | B2 | 10/2009 | LaBossiere et al. |
| 2013/0225353 | A1 | 8/2013 | Gallet et al. |
| 2015/0065285 | A1 | 3/2015 | McCune et al. |
| 2017/0190109 | A1 | 7/2017 | Holland et al. |

(Continued)

FOREIGN PATENT DOCUMENTS

| | | |
|---|---|---|
| DE | 3430062 A1 | 2/1986 |
| DE | 102020122721 A1 | 3/2022 |

(Continued)

OTHER PUBLICATIONS

International Search Report and Written Opinion dated Feb. 14, 2022 from counterpart PCT App No. PCT/IB2021/061158.

*Primary Examiner* — Edwin A Young
(74) *Attorney, Agent, or Firm* — SHUTTLEWORTH & INGERSOLL, PLC; Timothy J. Klima

(57) ABSTRACT

A planetary gearbox device includes a static ring gear, a rotatable planet carrier, a plurality of planet gears, each planet gear being connected to a bearing device, wherein at least one of the bearing devices is coupled to at least one lubricant scooping device and/or at least one lubricant reservoir device for collecting lubricant, in particular oil coming from the at least one bearing device, and at least one lubricant channel allows a flow of the collected lubricant towards a lubrication location and/or a lubricant supply for the planetary gearbox device.

12 Claims, 7 Drawing Sheets

(56) References Cited

U.S. PATENT DOCUMENTS

| | | | | |
|---|---|---|---|---|
| 2018/0280851 A1* | 10/2018 | Klaus | ..................... | B01D 45/14 |
| 2018/0297119 A1* | 10/2018 | Clarke | ..................... | F02C 7/36 |
| 2019/0292942 A1* | 9/2019 | Kallianteris | ........ | F16H 57/0479 |

FOREIGN PATENT DOCUMENTS

| EP | 3109417 A1 | 12/2016 |
|---|---|---|
| EP | 3892891 A1 | 10/2021 |

\* cited by examiner

PLANETARY GEARBOX DEVICE AND GAS TURBINE ENGINE WITH A PLANETARY GEARBOX DEVICE

This application claims priority to Patent Application GB 2208291.1 filed Jun. 7, 2022, the entirety of which is incorporated by reference herein.

The invention relates to a planetary gearbox device and a gas turbine engine with the features as disclosed herein.

Planetary gearboxes are commonly used e.g. in automotive or aircraft systems. In these cases, the efficient lubrication with a lubricant, in most cases oil, is important to assure the proper working of the gearbox itself and the devices connected with or to the gearbox, either on the input side (e.g. driving side with a driven sun gear) and/or the output side (e.g. parts connected to a rotating planet carrier).

Systems for lubricating planetary gearboxes are e.g. known from DE 10 2020 122 721 A1.

If the lubricant supply is interrupted for some time, e.g. by a negative or zero g event in an aircraft system, the oil pick-up in the engine oil tank can be exposed to air as the mass of lubricant in the tank due to the gravitational load force is pushed towards the top of the tank away from the pick-up point which is typically located at the bottom of the tank. This can ultimately result into an oil supply interruption to lubricated parts, such as bearings.

In aircraft systems, such as in the so called Ultrafan Power Gearbox, typical lubricated parts are journal bearings which rely on a continuous oil supply. If that supply fails for too long, it can result in a thermal runaway or seizure that can lead to hazardous outcomes for the gearbox or the complete engine.

Therefore, it is important to address the lubricant supply to planetary gearboxes, in particular in aircraft systems.

According to a first aspect, a planetary gearbox device is provided with a static ring gear, a rotatable planet carrier and a plurality of planet gears, each planet gear being connected to a bearing device. The at least one of the bearing device is coupled to at least one lubricant scooping device and/or at least one lubricant reservoir device for collecting lubricant, in particular oil coming from the at least one bearing device. Furthermore, at least one lubricant channel is allowing for a flow of the collected lubricant towards a lubrication location and/or a lubricant supply for the planetary gearbox device.

As the gearbox device design comprises a rotatable planet carrier, a centrifugal force is acting on the planet carrier during operation. Lubricant, such as oil, will be driven by this centrifugal force and collected by the at least one lubricant reservoir device from which it is gathered using the at least one lubricant scooping device. A lubricant channel is then feeding back the collected lubricant to a lubrication location such as e.g. a bearing device. Additionally or alternatively, the lubricant can also be fed back to a lubricant supply. In any case, this system provides a continuous lubricant supply in particular under negative g or zero g applications, which can in particular occur in aircraft systems.

In one embodiment, the lubrication location can be, as mentioned, the at least one bearing device and/or a part of the at least one bearing device. The lubrication device can e.g. be a journal bearing device. This would provide a feedback loop of the lubrication.

In one embodiment, the least one lubricant reservoir device is connected radially outward from the at least one bearing device, so that the centrifugal force can drive the lubricant flow. In particular, the at least one lubricant reservoir device can be positioned radially at the outer rim on a side of the planet carrier, in particular on an input side of the gearbox device. In certain types of gas turbine engines, there might be more room on the input side of the gearbox device. The at least one reservoir device forms a collection space for the lubricant extending at least in part circumferentially around the gearbox device. The lubricant can be achieved with a ring-like collection space or with one or more segments of a collection space.

The form of the at least one reservoir device can e.g. have an L-shaped or a curved cross-section with the concave part of the at least one reservoir device forming a space for collecting lubricant. Those lubricant collection spaces are not closed chambers but e.g. open towards the rotation axis making it easier for scooping the lubricant from this collection space.

In one embodiment, the at least one lubricant scooping device is static relative to the at least one lubricant reservoir device and the at least one lubricant scooping device is configured to take in a lubricant flow from the lubricant collection space formed by the at least one lubricant reservoir device during the operation of the planetary device. This way, the scooping itself can be achieved without moving parts, as the lubricant itself is moved by the rotating gear carrier and the co-rotating lubricant collection space.

The at least one lubricant scooping device can comprise a tube with an opening pointing in the opposite direction of the rotation of the planet carrier, so that rotating lubricant can enter the at least one scooping device. This is one example of a scooping with non-movable parts.

Furthermore, the at least one lubricant channel comprises a tube system which connects the at least one lubricant reservoir device with the lubrication location and/or the lubricant supply for the planetary gearbox device.

To efficiently collect lubricant from within the gearbox device the planet carrier can comprise at least one opening and/or carrier reservoir for allowing an inflow of the lubricant coming from the at least one bearing device. In particular, the orientation, shape and/or the size of the opening is oriented such as to collect a lubricant flow from one planet carrier and/or bearing device. This means in particular that the lubricant flow and the at least one opening are oriented towards each other. The shape of the at least one opening can be designed to match flow pattern of the lubricant.

The issue is also addressed by a gas turbine engine with features as disclosed herein.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s or 80 Nkg$^{-1}$s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Before embodiments of a gearbox device 30 are described in detail, a gearbox device 30 is described within the technical context of a gas turbine engine 10 used in connection with an aircraft. It should be pointed out that the gearbox device 30 itself is not limited to applications in aircraft engines.

Figure 1:
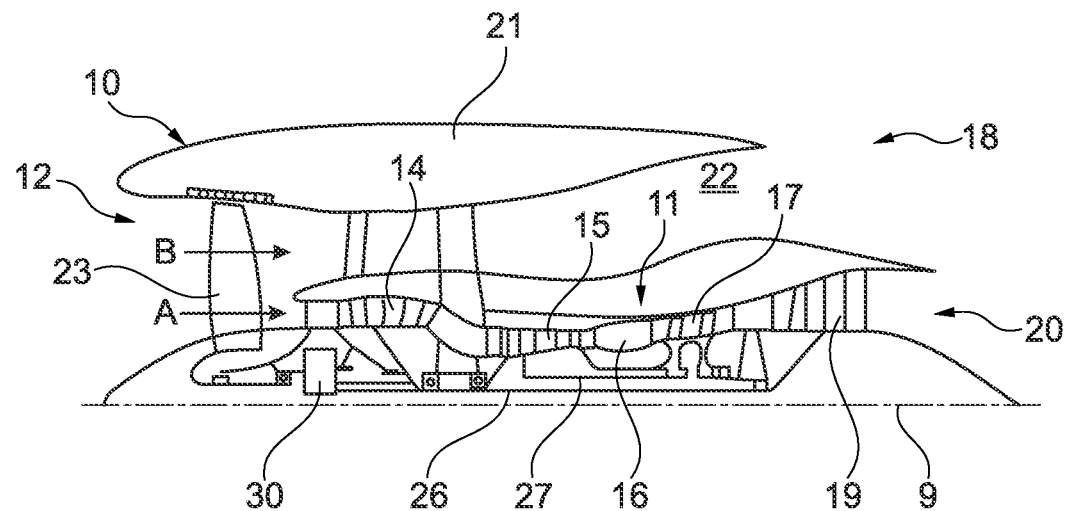
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox device 30. The gearbox device 30 not only comprises the details of the gearbox itself, which are described in FIG. 1 to 3, but also ancillary parts which are described in FIGS. 4 to 10.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox device 30 works as a reduction gearbox.

Figure 2:
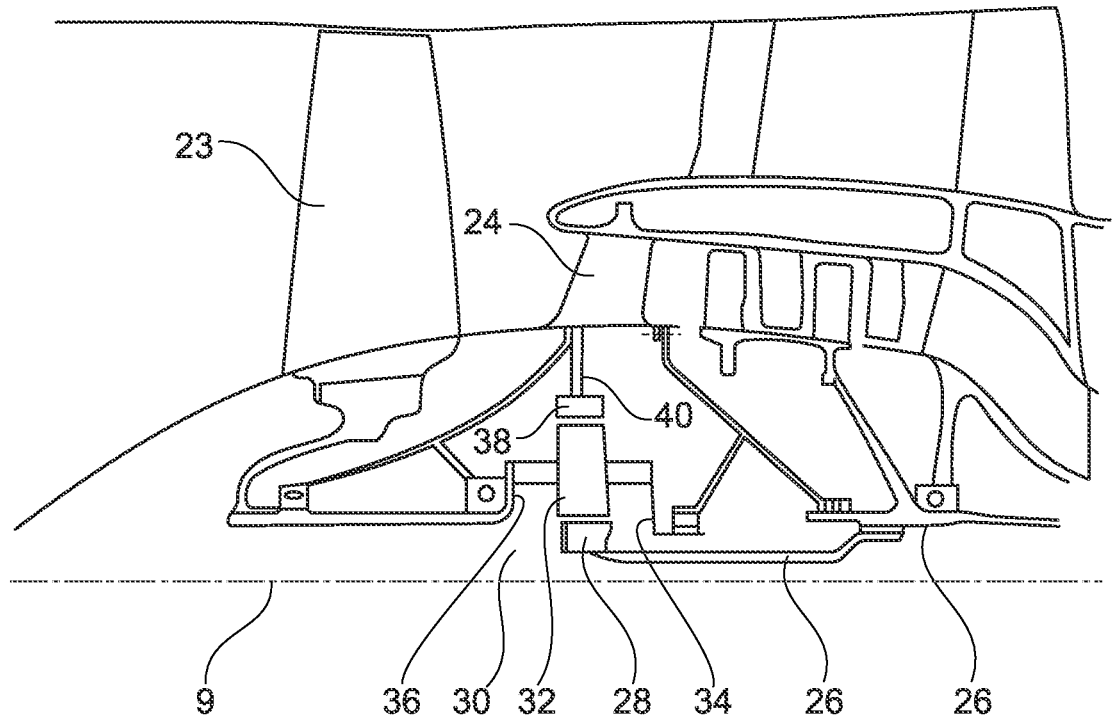
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
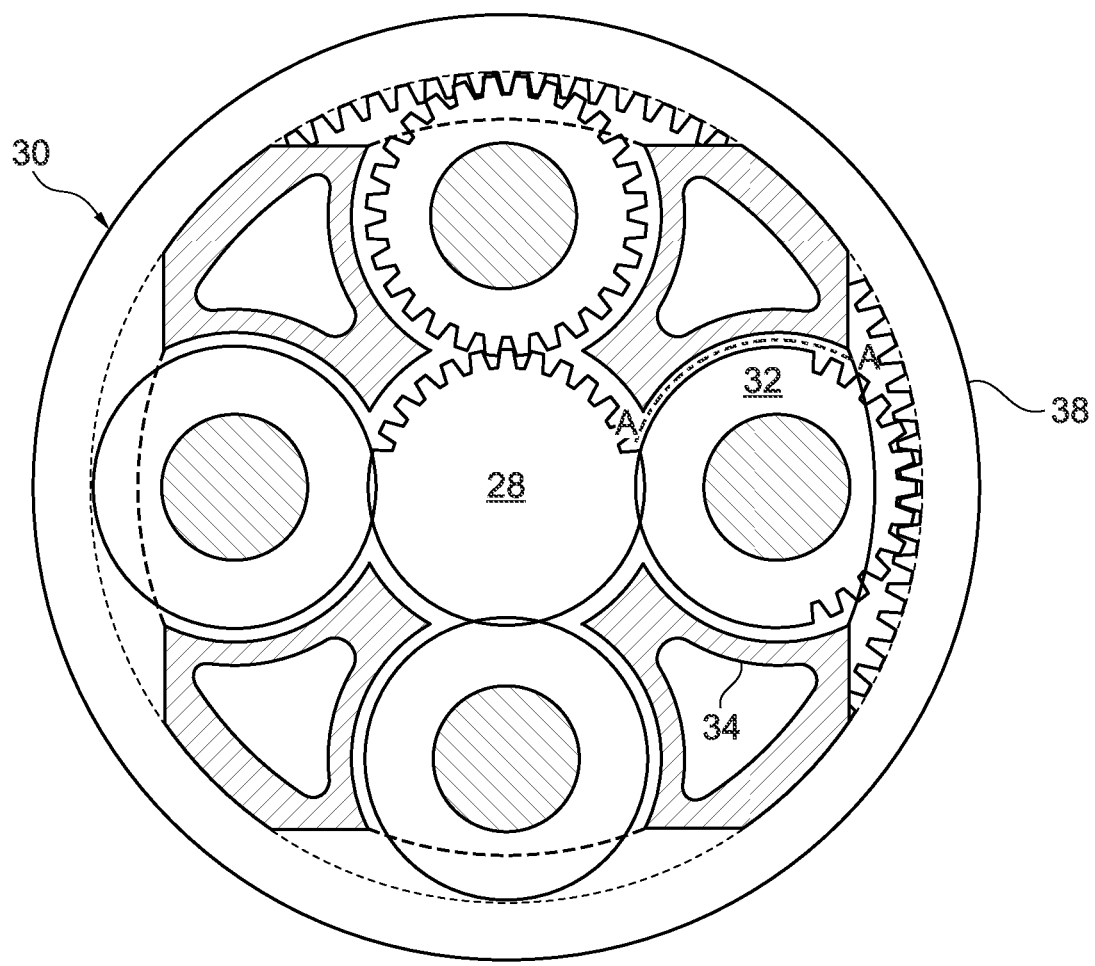
FIG. 3 is a partially cut-away view of a gearbox device for a gas turbine engine.

The epicyclic gearbox device 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox device 30 generally comprise at least three planet gears 32.

The epicyclic gearbox device 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox device 30 may be used—

It will be appreciated that the arrangement shown in FIGS. 2 and 3 is by way of example only, and various alternatives are within the scope of the present disclosure. Purely by way of example, any suitable arrangement may be used for locating the gearbox device 30 in the engine 10 and/or for connecting the gearbox device 30 to the engine 10. By way of further example, the connections (such as the linkages 36, 40 in the FIG. 2 example) between the gearbox device 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox device 30 and the fixed structures, such as the gearbox device casing) may be used, and the disclosure is not limited to the exemplary arrangement of FIG. 2.

Accordingly, the present disclosure extends to a gas turbine engine having any arrangement of gearbox styles, support structures, input and output shaft arrangement, and bearing locations.

Optionally, the gearbox device may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have affixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
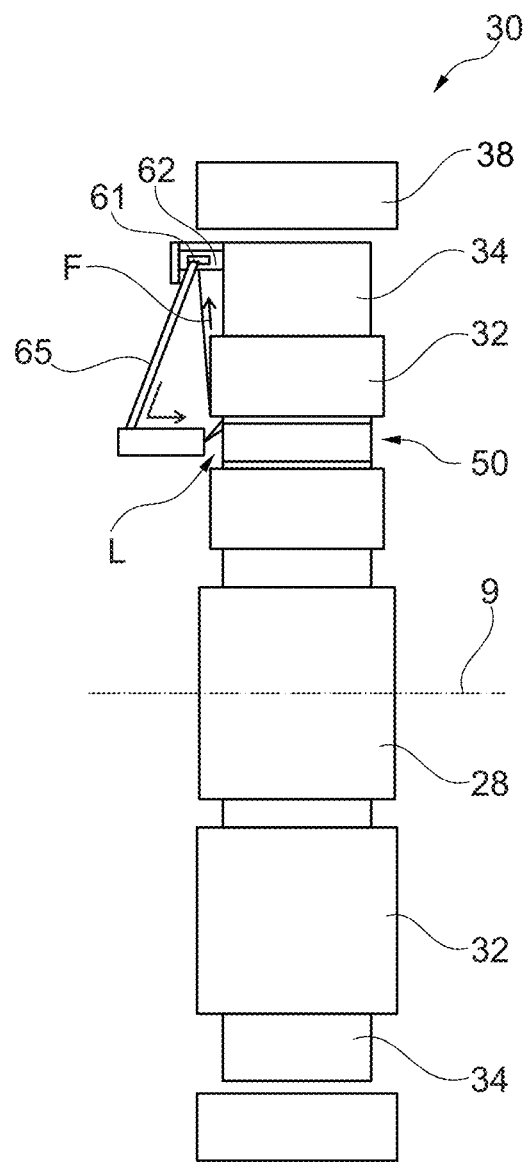
FIG. 4 is a schematic cross-section (perpendicular to the rotational axis) through an embodiment of a planetary gearbox device.

In FIG. 4 a schematic cross-section through an embodiment of the gearbox device 30 is shown. The general rotational axis 9 is also shown. The gearbox device 30 comprises a sun gear 28, which in the shown embodiment drives the gearbox device 30. The input side in the embodiment shown in FIG. 4 is assumed to be on the left hand side.

Within a rotatable planet carrier 34, five planet gears 32 are coupled with the sun gear 28, two of the planet gears 32 are visible in the sectional view of FIG. 4. In other embodiments more than five or less than five planet gears 32 can be used. The embodiment shown in FIG. 3 e.g. has four planet gears 32.

Each of the planet gears 32 is mounted on a bearing device 50, which is, in this embodiment, a journal bearing. In other embodiments the bearing 50 device could be of a different design.

A static ring gear 38 (see also FIG. 3) is positioned at the outer rim of the gearbox device 30 which is connected with other static parts of the gas turbine engine 30 (see e.g. FIG. 1).

The torque transmitted through the gearbox device 30 exits through the planet carrier 34 (here on the right hand side of the gearbox device 30) and drives e.g. the propulsive fan 23 (see FIG. 1).

The lubrication of planet gears 32 and bearing devices 50 is an important operational issue for any system involving a gearbox device 30.

To this effect, the embodiment of the gearbox device 30 described in FIG. 4 provides a device 60, 61, 65 which allows the collection of lubricant 62, in this case oil, exiting a bearing device 50 and it also allows a reintroduction of the collected lubricant 62 to a lubrication location L, e.g. at the bearing device 50 or at a different position at the gearbox device 30.

The planetary gearbox device 30 described in the following is an epicyclic planetary gearbox, which is driven by the sun gear 28, having a static ring gear 38 and a rotatable planet carrier 34.

As the planet carrier 34 is rotating around the axis 9 during operation, lubricant 62 is flowing radially outwards from the bearing devices 50 due to the centrifugal force acting on the planet carrier 34. In FIG. 4, this is schematically shown as a flow F.

But in this embodiment the flow F is also directed axially outwards, i.e., here towards the input side of the gearbox device 30 by means which will be described more detailed in embodiments shown in FIGS. 5 to 10.

Figure 5:
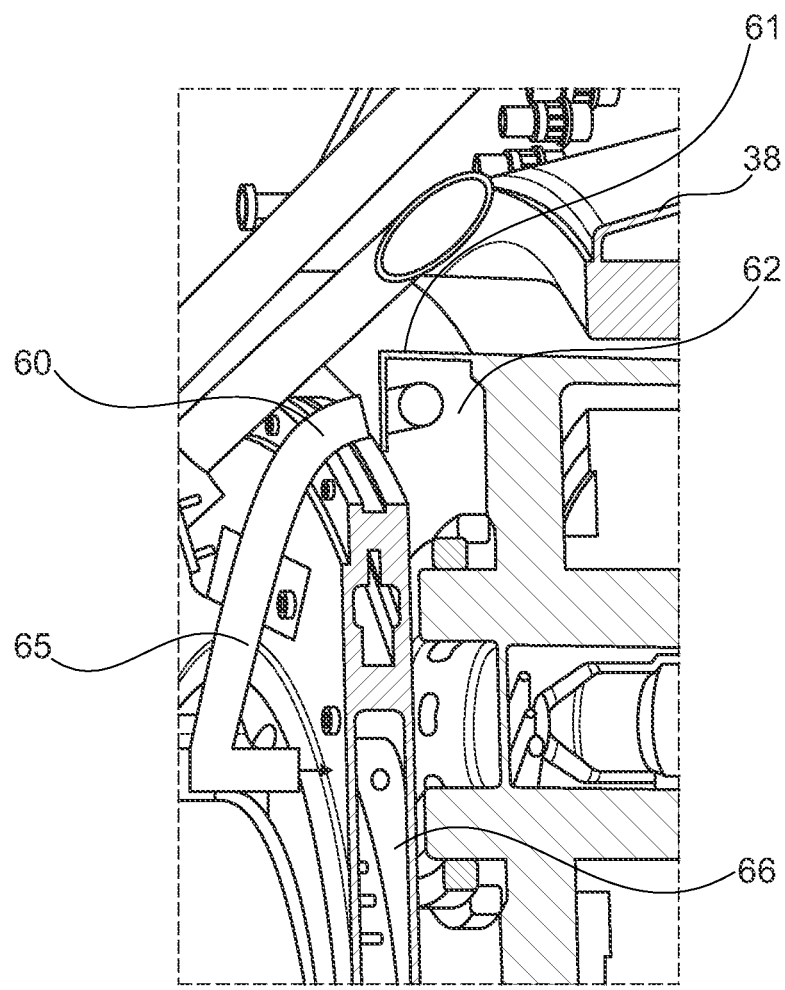
FIG. 5 is a schematic perspective cross-section through a radial outer part of an embodiment of the gearbox device, in particular as the one shown in FIG. 4.

At the outer rim of the planet carrier 34 and on its outer axial side, a lubricant reservoir device 61 is positioned (see also FIG. 5). This is essentially an L-shaped protrusion extending axially away from the planet carrier 34. On the distal end of this protrusion, a section of the lubricant reservoir device 61 points radially inwards. As best can be seen in FIG. 5, the lubricant reservoir device 61 forms a ring like lubricant collection space (with a part of the planet carrier 34 forming one wall) which is radially open inwards, i.e. towards the axis 9 of the gearbox device 30.

Due to the centrifugal force acting on the lubricant 62, the lubricant 62 exiting the bearing device 50 is collected in the ring-like collection space formed by the lubricant reservoir device 61. This lubricant collection space extends circumferentially around the outer rim of the planet carrier 34.

In other embodiments, the lubricant reservoir device 61, and hence the collected lubricant 62, is not positioned at the outer rim but some distance inwards from the rim, but still radially outward from the bearing devices 50. In the embodiments shown in FIGS. 4 and 5, the lubricant reservoir device 61 extends around the complete circumference of the gearbox device 30. In other embodiments, this does not have to be the case, i.e. the lubrication reservoir device 61 would only extend over a certain part of the gearbox device 30. Since the lubrication reservoir device 61 is connected to the planet carrier 34, it is—under operation—rotating relative e.g. to the stationary ring gear 38. Hence, also the lubricant 62 in the lubricant collecting space is rotating.

The lubricant 62 is gathered from the lubricant collecting space formed by the lubricant reservoir device 61 and the planet carrier 34 by a lubricant scooping device 60. In the embodiment shown, the lubricant scooping device 60 is a static (i.e. static relative to the planet carrier 34) tube with an opening pointing in the opposite direction of the rotation of the planet carrier 34. In this way, the rotating lubricant 62 in the collection space is scooped up by the static lubricant scooping device 60.

The kinetic energy of the lubricant 62 is providing sufficient energy to transport the lubricant 62 into the tube, which is part of a lubricant channel 65. The lubricant channel 65 then radially guides inwards the lubricant 62 from the radial outer part of the gearbox device 30.

As best can be seen in FIG. 5, the lubricant channel 65 is entering the lubricant collection space from underneath the lubricant reservoir device 61 and transports the lubricant towards a lubrication point L at the bearing device 50 (best seen in FIG. 4).

In the embodiment of FIG. 5, the lubricant 62 is transferred to a lubrication chamber 66 in a part attached to the side of the gearbox device 30 from which the lubricant 62 can be distributed to the bearing device 50 and other parts in the gearbox device 30. In general, the lubricant 62 can be transported to other locations in the gearbox device 30 or into a lubricant chamber 66 from which it then can be transported to one or more respective users.

Figure 6:
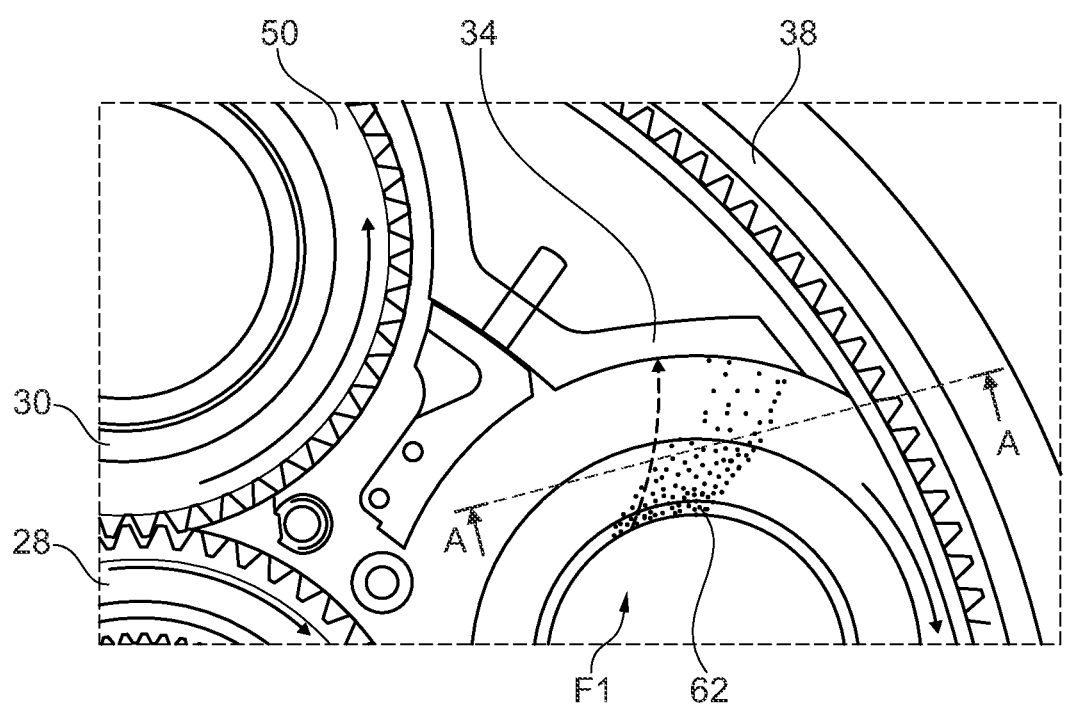
FIG. 6 is a schematic view of a face of a planet gear indicating the oil flow from bearing devices.

In FIG. 6, a schematic view onto a lug of the planet carrier 34 is shown. For reasons of simplicity, only one planet gear 32 is partially shown, which is driven by the sun gear 28 (shown only in part) at the center of the planet carrier 34. The sun gear 28 rotates in clockwise direction; consequently, the planet gear 32 is rotating in counter-clockwise direction. The planet carrier 34 rotates clockwise. All rotations are indicated by arrows in FIG. 6. Radially outwards, a part of the static ring gear 38 is visible in FIG. 6.

At the center of the planet gear 32, a journal bearing is located, being the bearing device 50.

In FIG. 6, the lubricant 62 is indicated by black dots so that the flow of the lubricant 62 can be visualized.

On the right-hand side of FIG. 6, the respective planet gear 32 and the respective bearing device 50 are not shown. As can be seen by the "lubricant cloud" in FIG. 6 lubricant 62 is exiting the gap between the gear shaft (pin) in the direction of the local acting centrifugal force.

Figure 7:
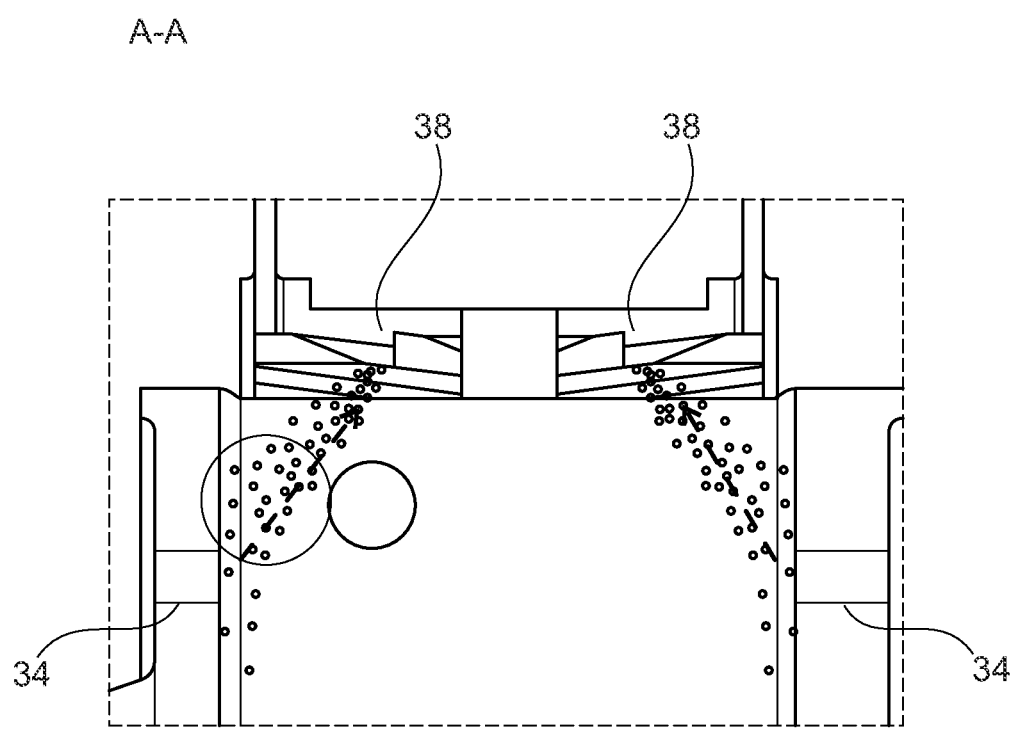
FIG. 7 is a sectional view along line A-A in FIG. 6.

In FIGS. 6 and 7 (i.e. a sectional view along A-A indicated in FIG. 6) flowpaths of the lubricant 62 are shown.

In one flowpath F1, the lubricant 62 flows along the pin of the bearing device 50 (not shown in FIGS. 6 and 7) till it reaches the wall of the planet carrier 34. In the embodiment shown in FIG. 6 it leaves the area around the pin and the planet gear 32 (both not shown in FIG. 6) under an angle of approximately 40°, measured against the local circumference of the pin of the planet gear 32. The lubricant flow F1 is in a plane parallel to the wall of the planet carrier 34 and is directed radially outwards towards the radial rim of the planet carrier 34. It flows in particular under the influence of the centrifugal force (and to some more less extent the Coriolis force).

Another lubricant 62 flowpath is shown in FIG. 7, as the lubricant exits here at the edge of the planet gear 32 and is accelerated towards the lug of the planet carrier 34. It then follows the centrifugal force. The conversation of momentum when fluid runs over the round transition between carrier side wall and the lug and the Coriolis force causes the flow on the side wall to take an angle that has a certain perpendicular component to the edge of the lug.

Figure 8:
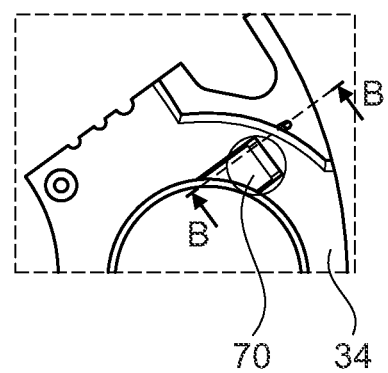
FIG. 8 is a partial view of a means for collecting lubricant.

The embodiment shown has in particular means for collecting lubricant from those flowpaths as it is shown in FIG. 8. to 10.

FIG. 8 shows (in an axial direction of the gearbox device 30) a detail of the planet carrier 34 from of the area around the ring gear 38 which itself is not visible in FIGS. 5 and 8. This embodiment comprises means to collect lubricant 62 along the flowpath F1 shown in FIG. 5.

At the circumference of the pin (not shown in FIG. 8) at the location of the flowpath F1 of the lubricant 62 exiting the area under approximately 40° (see FIG. 5) an opening 70 for the lubricant is positioned. The opening 70 is essentially a part of a rectangle, which is inclined also approximately by 40° so that it is oriented towards the flow F1 to collect it. An inclination of at least 30° has been found to work well.

In other alternatives, the opening 70 can be a slit or an opening with a curved rim.

The shape of the opening 70 could deviate from the one shown here, but it is beneficial if it is oriented so that it captures lubricant flowing away from the pin or the planet gear 32. The cross-section of the opening 70 can e.g. be perpendicular to the incoming flowpath F1.

The orientation of the opening 70 can e.g. be chosen through experiments and/or simulations of the lubricant 62 dispersion in gearbox device 30 so that the size and/or shape are altered to maximize the lubricant flow. Simulations show that 30 to 40% of the bearing lubricant can be recovered this way.

Figure 9:
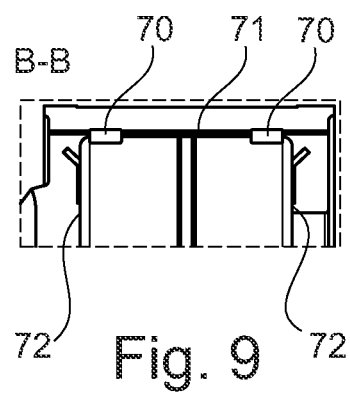
FIG. 9 is a cross-sectional view along lines B-B in FIG. 6.
Figure 10:
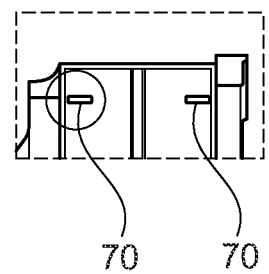
FIG. 10 is a cross-sectional view through a journal bearing device.

In FIG. 9 a cross-sectional view along the line B-B in FIG. 5 is shown, i.e. the cross-section is along the axial dimension of the gearbox device 30. Here, two openings 70 for the collection of lubricant 62 are visible. FIG. 10 shows a view from the inside of the bearing device 50, with the openings 70 positioned in the wall.

Both openings 70 are more positioned towards the lateral end of the gearbox device 30 rather than the middle. An axial bore 71 extends from one face of the planet carrier 39 to the other. Therefore, lubricant 62 collected though the openings 70 guided towards the outer rims of the ratable planet carrier 34. From there, the lubricant 62 can e.g. be collected by in the lubricant reservoir device 61 (as shown in FIGS. 4 and 5).

FIG. 9 also shows some internal channels 72 which capture lubricant 62 which is already at the axial ends of the bearing device 50. The lubricant 62 is also channeled towards the lubricant reservoir device 61 (see FIG. 4 or 5).

The embodiment of the gearbox device 30 can be used for geared turbofan engines 10, but can also be used in other types of machinery with lubrication users requiring uninterrupted lubrication. The lubricant 30 is caught in a rotating framework to use the centrifugal force as pump to feed the lubricant back e.g. to the lubrication location L. Through the conversion of the centrifugal force a pressure head is generated, so that the lubricant 62 is directed back to the journal bearing 50 with the lubricant channel connecting the static lubricating scooping device 60 to a static trough and oil jet (it is basically an orifice). In the embodiment shown, there is one static lubricant scooping device 61 for the whole system, and one lubrication channel 65 and one static trough and oil jet per journal bearing 50.

It is the purpose of this embodiment to maintain a continuous lubrication for the journal bearings 50 at conditions where the lubricant 62 feed from the main supply is interrupted. One possible example of an interruption is a negative load on an aircraft or a manoeuvre that results in exposure of the lubricant 62 off-take in the tank to air (not shown in FIG. 4).

The embodiment aims at catching and collecting the lubricant 62 as it leaves the journal bearing 50 and uses the centrifugal force to feed the lubricant 62 back to the lubricant location L, i.e. a user, thus creating a "close lubricant loop" that is in particular not affected by negative g force due to gust or aircraft manoeuvres (in case of aircraft manoeuvres these also include lateral accelerations that could affect the oil pick-up in the oil tank resulting in a similar issue as a transient negative g event).

The embodiment is based on a gearbox architecture with a rotating planet carrier 34 and a static ring gear 38. As the oil exits the journal bearing 50 it is collected. Features like grooves might be introduced to favour the lubricant as it leaves the journal bearing 50 to be directed towards the rotating lubricant reservoir device 61. In the embodiment, this is arranged on only one side of the journal bearing 50, there is little on the opposite side, but in principle the lubricant reservoir device 61, the lubricant scooping device 60 and the lubricant channel 65 could be positioned on both sides.

It is expected that this embodiment might not be able to catch all the lubricant as it leaves the journal bearing 50, but a sufficient amount that could allow the journal bearing 50 to sustain the transient negative g condition. In case the amount of flow is not sufficient, the solution can be complemented with other features (e.g. oil tank partition, accumulators, etc.).

The embodiment is also able to provide lubricant 62 flow also during normal operation and in particular during windmill and failure scenarios of the main lubricant feed supply.

The embodiment is self-contained within the gearbox device 30 and does not require any active components (e.g. valves) and it does not require additional complexity to be added to the rest of the oil system design.

Another advantage is that this solution will provide flow also during in-flight windmill and failure scenarios resulting in a simpler design of some of the oil system components and system solutions (e.g. auxiliary oil system, fault tolerant oil system).

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A planetary gearbox device comprising:
   a static ring gear,
   a rotatable planet carrier,
   a plurality of planet gears, each of the planet gears being connected to a respective bearing device,
   wherein at least one of the bearing devices is coupled to at least one lubricant scooping device and/or at least one lubricant reservoir device for collecting lubricant coming from the at least one of the bearing devices, the at least one lubricant scooping device and/or at least one lubricant reservoir device being positioned at a first radial position of the planetary gearbox device; and
   at least one lubricant channel arranged to direct a flow of the collected lubricant radially inwardly towards a lubrication location and/or a lubricant supply for the at least one of the bearing devices, where the lubrication location and/or lubricant supply is positioned at a second radial position of the planetary gearbox device, the second radial position is radially inward of the first radial position.

2. The planetary gearbox device according to claim 1, wherein the lubrication location is the at least one of the bearing devices and/or part of the at least one of the bearing devices.

3. The planetary gearbox device according to claim 1, wherein the at least one of the bearing devices is a journal bearing device.

4. The planetary gearbox device according to claim 1, wherein the at least one lubricant reservoir device is connected radially outward from the at least one of the bearing devices radially at an outer rim on a side of the planet carrier, on an input side of the planetary gearbox device, the at least one lubricant reservoir device forming a collection space for the lubricant extending at least in part circumferentially around the planetary gearbox device.

5. The planetary gearbox device according to claim 1, wherein the at least one lubricant reservoir device has an L-shaped or a curved cross-section with a concave part of the at least one lubricant reservoir device forming a lubricant collection space for collecting lubricant.

6. The planetary gearbox device according to claim 5, wherein the at least one lubricant scooping device is static relative to the at least one lubricant reservoir device, and the at least one lubricant scooping device is configured to take in a lubricant flow from the lubricant collection space formed by the at least one lubricant reservoir device during operation of the planetary gearbox device.

7. The planetary gearbox device according to claim 1, wherein the at least one lubricant scooping device comprises a tube with an opening pointing in an opposite direction of a rotation of the planet carrier, so that rotating lubricant enters the at least one lubricant scooping device during operation of the planetary gearbox device.

8. The planetary gearbox device according to claim 1, wherein the at least one lubricant channel comprises a tube system which connects the at least one lubricant reservoir device with the lubrication location and/or the lubricant supply for the planetary gearbox device.

9. The planetary gearbox device according to claim 1, wherein the planet carrier comprises at least one opening and/or carrier reservoir for allowing an inflow of the lubricant coming from the at least one of the bearing devices.

10. The planetary gearbox device according to claim 9, wherein an orientation, a shape and/or a size of the at least one opening is oriented to collect a lubricant flow from the planet carrier and/or the at least one of the bearing devices.

11. A gas turbine engine for an aircraft comprising:
   an engine core comprising a turbine, a compressor, and a core shaft connecting the turbine to the compressor;
   a fan located upstream of the engine core, the fan comprising a plurality of fan blades; and
   the planetary gearbox device according to claim 1, that receives an input from the core shaft and outputs drive to the fan to drive the fan at a lower rotational speed than the core shaft.

12. The gas turbine engine according to claim 11, wherein:
   the turbine is a first turbine, the compressor is a first compressor, and the core shaft is a first core shaft;
   the engine core further comprises a second turbine, a second compressor, and a second core shaft connecting the second turbine to the second compressor; and
   the second turbine, second compressor, and second core shaft are arranged to rotate at a higher rotational speed than the first core shaft.

* * * * *